Patented Nov. 3, 1936

2,059,541

UNITED STATES PATENT OFFICE 2,059,541

JELLY PREPARATIONS AND METHOD OF PREPARING JELLIES

Donald R. Thompson, Ontario, and Glenn H. Joseph, Corona, Calif., assignors to California Fruit Growers Exchange, Los Angeles, Calif., a corporation of California No Drawing. Application September 24, 1934, Serial No. 745,288

25 Claims. (Cl. 99—132)

This invention relates to improvements in jelly preparations and to methods of preparing jellies. According to our present understanding, this invention has special applicability to the confectionery art, particularly that phase of such art which is concerned with the use of gels and jelly-like materials.

In the manufacture of confectionery, gels and jelly-like materials are employed in the form of so-called gum drops and coated candies having jelly-like centers. In other words, the confection may consist in its entirety of a gel or jelly-like material suitably flavored or such material may be coated with chocolate or other suitable substance and thus comprise the center or some other constituent part of the confection. Instead of being actually coated the pieces may be crystallized or sanded in the manner known in this art. This will produce a piece having the complete surface covered but the covering will not be continuous as in the case of chocolate coatings and icings.

It is highly desirable that such gels or jelly-like materials as are employed in the confectionery art have a consistent texture and yet a sharp, clean cleavage when bitten or cut, and also have the desired degree of firmness, solidity or rigidity. In addition to these properties, the jelly-like material should have a desired flavor, and although a pleasingly tart taste was desired, such tartness could not be obtained heretofore.

In the preparation of these confectionery materials, a batch of jelly of any desired size is prepared in a fluid state and then poured into molds of the desired shape and size and allowed to solidify, or it is poured so as to set in sheets which are subsequently cut into pieces of the desired shape and size. Such pieces are then coated or otherwise handled, depending upon the desired character of the final product. In ordinary practice, where the use of individual molds is relied upon, it is customary to employ starch or similar material of a suitable nature which is formed into the shape desired for the final piece. If desired, other suitable material such as, for example, marshmallow, may be employed to fill the mold partially, thus producing a joined confectionery piece.

Usually the devices or machinery which pour the batches into molds are of such capacity that an appreciable time, for example, one or even two or more hours, may be consumed by the pouring of a single batch. Furthermore, as is true of all operations and particularly those carried on by a complex apparatus, the operation of pouring is subject to interruptions so that a very considerable period may elapse between the time a batch is prepared and the time the last portion of such batch is poured into molds. The jelly batches of this invention have the peculiar property of being adapted to casting in rubber molds (because, apparently, the dehydration by the aid of starch is not necessary) whereas batches of the prior art could not be cast satisfactorily in rubber molds.

Where the material is poured out upon slabs there to set and be cut into the desired shapes and sizes, a very much quicker setting will ordinarily ensue. The thinness of the layer of material and also, ordinarily, the coolness of the slab itself will assist materially in quickening the set. Even here, however, a too quick set is decidedly undesirable. The batch when poured will be very viscous. This makes the escape of entrapped air bubbles rather slow. Naturally the presence of air bubbles in the finished goods is highly undesirable. A sufficiently slow setting time to permit the escape of air bubbles will also allow the pectin to set slowly enough to give a firm, smooth texture throughout, as well as to give to the gel when it is set a highly desirable degree of elasticity and tensile strength.

It is quite evident, therefore, that the gel should be slow setting in character. Those familiar with jelly-like materials of this sort will realize that when, due to tardiness in pouring or any other interruption or cause, the material once hardens in the kettle or pouring machine, it is then a total loss since under all ordinary conditions it can not be remelted and poured, nor can it, with any convenience at all, be incorporated in a later batch. Piping systems are frequently employed in conveying the jelly mix from the kettle to other portions of the establishment and these relatively cold piping systems would cause the jelly mix to set and harden, thus plugging up the entire system and necessitating almost complete dismantling before the congealed material can be removed. A batch of gel which has prematurely hardened (as when it hardens before being poured) can only be discarded, or reworked with great difficulty.

Heretofore for confectionery use, jelly-like materials employing starches, gelatins, etc., have been used. Pectin jellies have also been proposed heretofore and those acquainted with the properties and possibilities of pectin jellies have suggested that they would have numerous advantages, among which may be mentioned the ready availability of pure pectin of unquestioned quality, the excellent texture and pleasing appearance of jellies made by the use of pectin, and a decided ease in handling. When starch or gelatin is used, the jelly mixtures or batches are very viscous, sticky, and adherent; jelly batches employing pectin are thinner, not as viscous, and much more easily handled. Furthermore, jellies containing starch or gelatin have to be placed in drying rooms for two or three days after pouring and before packing, dipping or otherwise handling the resulting articles, whereas products made from pectin jellies can be used immediately after such jellies have set or congealed. Upon storage, starch goods become quite hard and dry, whereas the products of this invention do not lose their desirable characteristics.

A decided disadvantage in the use of gelatin for the production of goods of this sort is the fact that gelatin will not stand the high cooking temperatures necessary to obtain a desired percentage of solids. Pectin of good quality may be subjected to such temperatures for the length of time necessary in the cooking without any serious impairment of this setting power. Starch gives a very cloudy and stringy piece, and during preparation of the batch the starch has a tendency to hydrolyze, resulting in a syrupy mass which often is incapable of setting to a satisfactory jelly. Agar may be used in the production of so-called "Jap Goods". Agar is very readily hydrolyzed by acid in the presence of heat, and accordingly goods employing agar, if of satisfactory firmness, must be kept very insipid in taste. Furthermore, agar goods are extremely brittle at high solids contents.

When pectin gels are used, we have found it desirable (in order to secure optimum results) to have the final batch contain preferably from about 72% to 78% of soluble solids. If desired, the goods may be cooked to 80% solids. If goods of this character be dried in starch, they may lose sufficient moisture to raise the solids content of the final articles to as high as 85%. The batches of this invention may even be cooked to 85% solids, which could not be accomplished with other types of goods, in the presence of appreciable acidity. It is known that pectin gels of about 72% to 78% solids concentration (other factors being equal) will ordinarily exhibit a much more rapid setting, solidifying or congealing action than those having a lower solids concentration. It is not possible to produce such high solid content gels and concomitantly have the product quite tart (as where it is desired to bring out or emphasize a fruit flavor employed in the product or where it is desired to improve the palatability of the piece) because, as is well known, under ordinary conditions an increase in acidity of a jelly mix will increase the speed at which a pectin gel will set. Apparently, therefore, it is impossible to produce a tart pectin gel which will set slowly and to the best of our knowledge, it has been impossible heretofore to produce a tart, slow-setting pectin gel having a high solids concentration of say about 75%.

It will thus be seen that there are certain definite limitations involved in the use of pectin gels in products of this sort, or wherever it is desired to produce a firm, chewy jelly of good texture and high resistance to shear which is not easily fractured.

This invention is based upon the discovery that by incorporating a suitable ingredient or ingredients in a jelly batch or preparation, it is possible to produce a product which can be made as tart as is desired without making it quick-setting. Moreover, the gel resulting from the preparation embraced by this invention is sparklingly clear and has a very smooth texture of the required firmness. The ingredients which are preferably employed are edible, soluble salts of a relatively strong base and a relatively weak acid. Sodium acetate, sodium citrate, potassium, magnesium and sodium bicarbonate are examples of ingredients which may be satisfactorily employed.

Accordingly, it is an object of this invention to provide and disclose methods and means for preparing jelly batches high in soluble solids as well as in acid and which are capable of setting slowly to a firm, smooth-textured, sparklingly clear product.

Another object of this invention is to provide and disclose means and methods for rendering pectin gels abnormally high in pectin content, in soluble solids content and in acid content, slow setting, whereas normally such pectin gels would be very quick-setting.

A further object of this invention is to disclose and provide pectin preparations suitable for the manufacture of pectin gels, batches of said pectin preparations being adapted to set slowly into firm, tart, jelly-like products.

A still further object of this invention is to provide pectin preparations suitable for the manufacture of confectioners' gels which set slowly into firm, tart products.

Yet another object of this invention is to provide and disclose a method whereby normally quick-setting pectin gels may be caused to set slowly even in the presence of excess acid and high pectin and soluble solids content.

An object of this invention is to provide and disclose a method for utilizing salts of relatively strong bases and relatively weak acids to render gels abnormally high in pectin, in soluble solids and in acid, slow-setting.

Another object of this invention is to provide and disclose a method and means whereby jelly batches abnormally high in pectin, in soluble solids and in acid, which would normally set very rapidly into products having a rough, grainy, brittle texture, and low in tensile strength, are enabled to set slowly into products having a smooth, clear, uniform texture and a higher tensile strength and giving a sharp, brilliant cleavage when cut or bitten.

Another and further object of this invention is to provide and disclose a method and means for utilizing sodium acetate or sodium citrate for accomplishing the results and purposes set forth herein.

Other objects will be in part obvious and in part will appear from a contemplation of the invention as set forth herein and in the appended claims.

Any pectin suitable for use in jelly making may be employed in the preparation of the product of this invention and in the method by means of which such product may be obtained. At present, it appears preferable to employ a relatively pure dry pectin, pectin such as that prepared in accordance with United States Patent No. 1,497,884, being eminently suitable. Such pectin may, or may not, have been treated by the process set forth in United States Reissue Patent No. 19,197 but we prefer to use pectin so treated.

As stated hereinabove, it has been discovered that a gel preparation containing pectin, sugar, sufficient acid to produce a tart gel, and preferably certain substances from the group including such carbohydrates as invert sugar, glucose, corn syrup and other dextrinous substances, as well as glycerol, will produce a jelly batch capable of setting slowly into a tart, firm, coherent product if to such gel preparation a soluble salt of a strong base and a weak acid has been added. By slow-setting gel preparations of the character embraced by this invention, reference is made to gel preparations which would allow the operator to produce a satisfactorily acidified batch and pour or cast the same without jeopardizing the quality of the product. The time should be sufficient to permit escape of bubbles during slab work; in some cases during casting and molding the time interval between cooking and setting may be as long as two or even four hours. All of these setting times are almost infinitely long when compared to the setting time of pectin jelly batches that have been known heretofore.

In order to give the fullest possible understanding of this invention, reference will be had to certain specific examples, in which, for purposes of illustration, sodium acetate and sodium citrate are used. It will be obvious to those skilled in the art that these examples are illustrative but not limiting and that certain alterations, variations and substitutions can be made without departing from the spirit and essence of the invention. Certain of these changes will be pointed out. Others will be obvious upon a contemplation of this invention while still others will readily suggest themselves to those skilled in the art.

It is to be remembered that for products adapted for use as confections, the percentage of solids should be about 75% as products containing about 75% of soluble solids have a highly desirable firmness, solidity, rigidity and chewy texture. They are not easily fractured and offer some resistance to shear. They are not soft and still they are not hard. They are not as subject to fermentation and therefore have good keeping qualities. Variations of the solids may, of course, be made to achieve certain particular desired results within the limitations set forth previously.

The following example is illustrative of a batch coming within the scope of this invention with which excellent results can be produced:

| | | |
|---|---|---|
| 100 grade pectin | oz | 15 |
| Sodium acetate (crystalline) | do | 2¾ |
| Citric acid (crystals or powdered) | do | 3½ |
| Glucose (43° Bé.) | lb | 20 |
| Cane sugar | do | 20 |
| Water | gals | 3 |

If desired, the ingredients of the above batch may be suitably varied. For example, the amount of sodium acetate and citric acid may be reduced to 1½ and 2 ounces respectively.

Where only pieces that are to be cast into starch or the like are being prepared, the pectin in the formula given above may be reduced to 8 ounces. In such case, for the production of a tender piece, the sodium acetate may be reduced to 1¼ ounces and the citric acid to 2¼ ounces. For the production of a tart and still tender piece we may employ 3 ounces of sodium acetate and 4 ounces of citric acid.

A particularly satisfactory variation using fruit pulp is as follows:

| | | |
|---|---|---|
| 100 grade pectin | oz | 15 |
| Sodium acetate (crystalline) | do | 1 |
| Citric acid | do | 2 |
| Glucose (43° Bé.) | lb | 20 |
| Cane sugar | do | 20 |
| Fruit pulp (2 #10 tins or) | do | 13 |

Batches consisting of ingredients as outlined above, excepting that employing fruit pulp, may be handled as follows:

Put the water in a kettle and heat hot (120°–170° F.).

Thoroughly mix the 100 grade pectin with about 4 pounds of granulated sugar.

Add the pectin-sugar mixture to the warm water as it is being stirred with a paddle. Continue to stir and heat to boiling. Boil vigorously for a moment.

It is desirable to draw off a little of this mixture and pour it back into the kettle so as to flush out the drain pipe and connections.

Combine the acetate of soda and citric acid. Dissolve in a small portion of hot water.

Add the acetate of soda-citric acid solution to the kettle and then the glucose. Heat to boiling again.

Add the remainder of the sugar and cook to 224° F. (This temperature corresponds to about 78% total soluble solids at sea level, for a batch of this composition. It is sufficient to cook the batch to 12° F. above the boiling point of water at any particular location.)

Add the color and flavor, then cast into starch at once or pour on a slab. This formula will produce about 48 pounds of candy. The finished pieces may be crystallized, sanded, iced, or coated with chocolate.

Where fruit pulp is employed, it may be added after the pectin and buffer salt have been dispersed in water, or, as is ordinarily the case, it may be mixed with some water and used for a medium in which to disperse the pectin.

The above directions may, of course, be suitably varied. For example, the pectin and acetate may be mixed and supplied to the manufacturer who would then employ this mixture as an integral ingredient. The acetate may be mixed with the pectin at the start of the cooking operation. The acid may be dissolved in a little water, and may be added at any time during the process. We prefer to add it after the pectin has been gotten into solution. In the event the acid is added last (during or after the final cooking) it is not necessary to form the mixture of acid and acetate, as above described, as the acetate may be separately added prior to cooking.

By the term "glucose" mentioned hereinabove, reference is made to the product obtained commercially under the name and which is usually prepared by hydrolyzing starchy materials with acid. It may contain in excess of 80% solids of which some portion are non-sugar solids, such as dextrins and the like. It is not essential that glucose be employed but in substituting other ingredients for glucose, allowance should be made for the acidity and moisture of the glucose previously used.

It has been found desirable to use glucose, invert sugar, glycerol or commercially available dextrose, and that these ingredients have a tendency to impart a certain smoothness to the final product, although their presence is not absolutely necessary. The proportion of dextrinous ingredients employed (such as glucose) may be appreciably varied.

A very satisfactory product, omitting the glucose previously referred to, may be prepared as follows:

| | | |
|---|---|---|
| 100 grade pectin | oz | 16 |
| Sodium acetate | do | 1 |
| Citric acid | do | 2 |
| Honey (82–83% soluble solids) | lb | 20 |
| Cane sugar | do | 20 |
| Water | gal | 3½ |

The preparation may be used substantially as outlined previously, except that we prefer not to boil the honey with the other ingredients. The honey is heated separately to about 170° F. The balance of the batch is boiled up to the desired solids concentration, keeping in mind the solids concentration of the honey, and the solids concentration desired in the final batch. After the batch has been cooked to the desired point, it is cooled to about 170° F. The honey is then added and stirred in thoroughly. Because the batch is reduced to such a low temperature before being poured, and because it contains such a high proportion of pectin and soluble solids, we prefer not to add the acid until just before the batch is to be poured. We find that by operating in this way and pouring the finished batch upon a slab, there is time enough for air bubbles to escape from the batch before it sets. When similar batches are made without the practice of our invention, we find that even when the addition of the acid is delayed until just before pouring, it is almost impossible to get them out of kettles before they are set, giving a highly undesirable texture due to the very rapid setting which results in very imperfect formation of the gel structure and also in the incorporation of a large amount of air bubbles.

Obviously, the 100 grade pectin specifically mentioned in the illustrative example, may be replaced by an appropriate amount of pectin of another grade. In place of the citric acid solution, solid citric acid may be used or tartaric acid, or any other suitable acid, acidic or acid-forming material may be substituted. Naturally the amount of such other material to be used will depend upon the nature of the material. Instead of water and separate flavoring, fruit juices may be used, proper allowance being made for the natural acid and sugar content of the fruit juice, or fruit pulp may be employed as previously directed. A delightful piece may be prepared by first using the water to make an extract from a suitable amount of ground coffee. Those skilled in the art will readily conceive of additional variations which can be made without departing from this invention.

Attention is here called to a characteristic peculiarity of this invention and which furnishes a sharp distinction between it and the prior art. One pound of 100 grade pectin possesses enough jelling strength that it is able to set to a jelly of a definite standard of firmness 100 pounds of sugar as a gel containing 65% of soluble solids and sufficient acidity. In a gel containing 75% of soluble solids this same amount of jelling strength, contained in one pound of 100 grade pectin, enables it to set 140 pounds of sugar to a gel of the same standard firmness. The two gels mentioned above would set to a standard firmness in a normal length of time. Using 1 pound of 100 grade pectin with 100 pounds of sugar but bringing the solids concentration of the final batch up to 75% would increase the speed of set greatly, due to the excess of jelling power present in the pectin. If one pound of 100 grade pectin be used for setting only 40 pounds of sugar in a gel having 65% soluble solids, the great excess of jelling strength possessed by the pectin, being enough to set 100 pounds of sugar under the same conditions, will cause a tremendous increase in the rate of jellification. Furthermore, the use of sufficient acid in any of the foregoing batches to give a truly tart gel will bring to bear that additional factor tending to increase greatly the rate of gel formation.

In accordance with one embodiment of this invention, however, 1 pound of this same 100 grade pectin is caused to set only approximately 40 pounds of sugar in a gel which is 75% solids. In other words, for the particular amount of sugar employed and the solids concentration at which it is finished, approximately three and one-half times as much pectin is employed, as would be required to set the gel to a normal jelly strength. This factor, as pointed out, tends to increase the rate of setting enormously, and would in fact, under all ordinary conditions produce an instantaneous set with only a relatively small amount of acid. In addition, enough acid is employed to give a definitely tart gel, which is also a factor increasing the speed of set. Yet, by means of our invention we are able to produce these gel batches so that they set in desirably long periods of time.

It is to be noted that the prior art has disclosed pectin preparations composed of pectin and a salt of a relatively strong base and a relatively weak acid. British Patent No. 283,657 to Leo and United States Reissue Patent No. 19,197 to Jameson, for example, disclose pectin products which consist of pectin and a salt of a strong base and a weak acid. The former, however, relates solely to the solubilizing of the pectin while the latter is principally concerned with the standardization of the pectin as to pH so that jelly may be made therewith "in the usual manner". If sufficient acid is added to a jelly batch employing pectin products of the character disclosed in the aforesaid British and United States Letters Patents, it will be found that the jelly batch will set almost instantly in the kettle. In other words, it is impossible to produce a slow setting tart gel of about 75% solids by following the teachings of these prior patentees. Actually, the pectin which we prefer to use, is pectin which has been treated in accordance with United States Reissue Patent No. 19,197.

While the use of sodium acetate has been specifically discussed hereinabove, it is to be particularly understood that this invention is not limited thereto. Salts of strong bases and weak acids are well known and any of these salts which are edible and which give satisfactory results, may be used. Sodium citrate, or sodium bicarbonate may be employed, for example. Sodium acetate is preferred, however, not only because it is eminently satisfactory, but also because it can be very readily obtained in a sufficiently high state of purity and at present its use is more economical.

Suitable salts of strong bases and weak acids may be prepared or formed in the gel batches by the addition of a suitable base (such as sodium hydroxide) to the batch to which a suitable excess of acid had been added.

As pointed out previously, this invention also contemplates a pectin preparation in substantially dry form consisting of pectin and a salt of a strong base and a weak acid, such preparation being adapted for use in jelly batches of high solids concentration and high acidity. If such preparation is to be stored for any length of time, it is advisable to have the ingredients substantially dry so as to prevent deterioration. This refers equally to the standardizing material.

For standardizing the mixture of pectin and sodium acetate, we have found that lactose is highly satisfactory. Apparently, alpha and beta lactose may be used interchangeably. In actual practice, we employ U. S. P. milk sugar. We should point out that lactose is the only spacing agent we have found satisfactory under all conditions. Corn sugar may replace part of the lactose when anhydrous sodium citrate is used instead of sodium acetate.

We find it preferable instead of having the pectin absolutely dry, to let it retain its normal equilibrium content of moisture. With most of the pectins with which we have worked, this lies at about 7% moisture. Where the sodium acetate is to be incorporated with the pectin and furnished to the manufacturer as an integral ingredient, we find it desirable to employ anhydrous sodium acetate. This, of course, requires a correspondingly smaller weight of the acetate. It is to be understood that the quantity of the sodium acetate or other salt used in a gel batch can be varied; larger quantities are generally used for coating than in slab work. The acidity of the glucose and residual acidity of the pectin used may influence the quantity of acetate required. Higher amounts of sodium acetate maintain the gel batches more fluid during cooking and reduce the tendency of the batch to stick to the walls of the kettle. In general, the gel batch (at the end of the cooking operation) can contain the equivalent of from about 0.28% or 0.38% to 0.46% of sodium acetate. Acetic acid, being a weaker acid than the acids ordinarily used as setting acids in the batch, will be set free and, being relatively volatile, will largely escape from the batch during the cooking. The sodium ion will, of course, remain as residual salts in combination with nonvolatilized acid contained in the batch. In certain of the appended claims we use the expression "residual salts equivalent to sodium acetate" and similar expressions. It is to be understood that the material is added as sodium acetate but may, during the cooking, be converted in whole or in part to other salts, as explained above. A dry pectin preparation suitable for this work can contain from about 15 or 20 to 25 parts of crystalline sodium acetate to 100 parts of 100 grade pectin or its equivalent. In general, a gel batch made with sodium citrate will contain from about 0.19% to about 0.38% anhydrous sodium citrate.

A pectin product in finely divided, substantially dry form, suitable for use in the preparation of gel batches in accordance with this invention, is exemplified in the following mixture:

|  | Pounds |
|---|---|
| 200 grade pectin | 381 |
| Sodium citrate | 169 |
| Lactose | 250 |
| Corn sugar | 200 |

The pectin used in the above mixture was made by the process of Patent No. 1,497,884 and had inherently rapid-setting properties, i. e., under standard 65% solids jelly testing condition a set was observed in about 1½ to 2 minutes.

The above mixture may be used in producing a confectioner's gel by combining 0.295 kg. of the mixture with—

| Sugar | kg | 4.64 |
|---|---|---|
| Glucose | do | 4.64 |
| Water | do | 4–5 |
| Citric acid solution containing 50% citric acid by weight | cc | 90 |

Attention is called to the fact that pectins vary in inherent setting characteristics. Pectins of the prior art usually exhibited rapid set, that is, they set in about 1 to 2 minutes. Recently it has been found possible to produce pectin which in an ordinary pectin jelly will not exhibit set for 6 to 8 minutes or even longer. The amount of salt of a strong base and a weak acid present in the gel batch made in accordance with this invention is influenced by the inherent setting characteristics of the pectin used in such batch. Generally and approximately, the substitution of a pectin having an inherent 6 minute set for a pectin having an inherent 1½ minute set permits the use of about one-half the amount of sodium acetate, sodium citrate, or other salt of a strong base and a weak acid used previously with the quick-setting pectin.

A standardized, substantially dry, finely divided and non-caking pectin product particularly adapted for use in the preparation of tart gels of high solids content in accordance with this invention, made from a pectin of 200 grade having an inherent set of say 6 to 10 minutes, may have the following composition:

|  | Pounds |
|---|---|
| 200 grade pectin | 381 |
| Alpha lactose (commercial milk sugar) | 250 |
| Crystalline sodium citrate ($Na_3C_6H_5O_7.2H_2O$) | 93 |
| Commercial corn sugar | 276 |

This preparation may be substituted for the pectin preparation used in the batch mixture last above mentioned.

The products produced in accordance with this invention or other gel batches embodying this invention may not only be used as centers of confections but may also form the outer coating of a confection; such outer coating may be obtained by dipping fruit or other suitable material into the gel batch while it is still fluid and then allowing the adherent coating to solidify after the dipped article has been removed.

In describing the gels of this invention, the term "abnormally high in pectin" refers to a gel batch which contains one and one-half or more times the weight of pectin required to set the weight of soluble solids present in a 65% solids jelly; the term "high in soluble solids" refers to gels containing more than about 72% of solids; and the term "abnormally high in acid" refers to gels containing high proportions of acid with respect to the total weight of gel.

This application is a continuation in part of application Serial No. 514,702, filed February 9, 1931.

We claim:

1. A pectin jelly batch suitable for confectioners' products, said jelly batch being high in pectin content and acid constituents, containing dextrinous constituents and not more than about 40 pounds of soluble solids per pound of 100 grade pectin and containing about 75 per cent of solids characterized by the presence of residual salts equivalent to sodium acetate in the proportions of about 20 to 25 parts to 100 parts of 100 grade pectin or its equivalent, and the ability to be poured and handled without presetting and to set slowly to form a firm, smooth-textured, tart gel.

2. A pectin jelly batch suitable for confectioners' products, said jelly batch being high in pectin content and acid constituents, containing dextrinous constituents and containing about 75 per cent of solids, characterized by the presence of the equivalent of 0.38 per cent to 0.46 per cent of sodium acetate, and the ability to set sufficiently slowly to permit handling and pouring in commercial operation and form a firm, smooth-textured, tart gel.

3. A pectin jelly batch adapted to set slowly to a firm, tart gel of good texture, said jelly batch being abnormally high in pectin and acid constituents and containing about 75 per cent of solids but not more than about 40 pounds of soluble solids per pound of 100 grade pectin, said jelly batch containing a soluble salt of a strong base and a weak acid in an amount sufficient to convert said jelly batch from a normally quick-setting batch into one which will set in not less than about one hour.

4. A pectin jelly batch adapted to set slowly to a firm, tart gel of good texture, said jelly batch being abnormally high in pectin and acid constituents, containing dextrinous constituents and containing about 75 per cent of soluble solids, said jelly batch also containing a soluble salt of a strong base and a weak acid in an amount sufficient to convert said jelly batch from a normally quick-setting batch into one which will set in not less than about one hour.

5. In a method of making jelly batches for confectioners' products, the steps of dissolving in an aqueous medium the equivalent of 100 parts of 100 grade pectin, 20 to 25 parts of sodium acetate and not more than about 4000 parts of sugar or its equivalent, and cooking the batch to a concentration of approximately 75 per cent solids whereby the batch will set sufficiently slowly to permit handling and pouring in commercial operation in the presence of sufficient acid to impart a tart taste to the product.

6. A confection comprising a pectin gel which is abnormally high in pectin and containing about 75 per cent of soluble solids and a sufficient amount of acid to impart a tart taste and containing the equivalent of from about 0.38 to 0.46 per cent sodium acetate, said confection being characterized by being tart to the taste, firm, and smooth in texture.

7. In a method of making confections, the steps of dissolving in an aqueous medium the equivalent of 100 parts of 100 grade pectin, 20 to 25 parts of sodium acetate and not more than about 4000 parts of sugar or its equivalent and sufficient acid to impart a tart taste to the batch, cooking the batch to a concentration of approximately 75 per cent solids, and dipping confectionery materials in such cooked batch to form a tart, jelly-like coating thereon.

8. In a method of making jelly batches for confectioners' products, the steps of forming a cooked batch containing about 75 per cent solids and cointaining the equivalent of 100 parts of 100 grade pectin, 20 to 25 parts of a salt of a strong base and a weak acid, not more than about 4000 parts of sugar or its equivalent, and a sufficient amount of acid to give a tart taste, whereby said batch can be poured and will set slowly to a firm, smooth-textured, tart gel.

9. In a method of making jelly batches for confectioners' products, the steps of forming a cooked batch containing about 75 per cent solids and containing the equivalent of 100 parts of 100 grade pectin, the equivalent of 20 to 25 parts of sodium acetate, not more than about 4000 parts of sugar or its equivalent, and a sufficient amount of acid to give a tart taste, whereby said batch can be poured and will set slowly to form a tart, smooth-textured, firm gel.

10. A pectin jelly batch for confectioners' products, containing: about 75 per cent of solids comprising; sufficient acid to impart a tart taste thereto, an abnormally high proportion of pectin, not more than about 40 pounds of sugar per pound of 100 grade pectin, dextrinous constituents, and a sufficient amount of a salt of a strong base and a weak acid, to permit said batch to set slowly to a firm, smooth-textured, tart gel.

11. A pectin jelly batch suitable for confectioners' products, said jelly batch being high in pectin content and acid constituents and including dextrinous constituents and a soluble salt of a strong base and a weak acid, said batch being characterized by the presence of a sufficient amount of said salt whereby the batch will set sufficiently slowly to permit handling and pouring in commercial operation and form a tart, firm, smooth-textured gel containing about 75 per cent of solids.

12. A pectin jelly batch suitable for confectioners' products, said jelly batch being high in pectin content and acid constituents and containing dextrinous constituents and sodium acetate or its equivalent, said batch containing not more than about 40 pounds of soluble solids per pound of 100 grade pectin, said sodium acetate being present in a sufficient amount whereby the batch will set sufficiently slowly to permit handling and pouring in commercial operation and form a tart, firm, smooth-textured gel containing about 75% of solids.

13. A pectin jelly batch for confectioners' products containing about 75% of solids and including pectin, sugar and acid; the batch containing a weight of pectin one and one-half or more times that which would normally set the solids present in a jelly of 65% solids content; the batch also containing sufficient acid to impart a tart taste thereto and a sufficient amount of a salt of a strong base and a weak acid to permit said batch to set slowly to a firm, smooth-textured, tart gel.

14. A pectin jelly batch for confectioners' products containing about 75% of solids and including pectin, sugar and acid; the batch containing a weight of pectin one and one-half or more times that which would normally set the solids present in a jelly of 65% solids content; the batch also containing sufficient acid to impart a tart taste thereto; and an added salt of a strong base and a weak acid in said batch in an amount sufficient to permit said cooked batch to set slowly to a firm, smooth-textured, tart gel, said amount of salt being dependent upon the inherent rapidity of set of the pectin used.

15. A pectin jelly bath for confectioners' products containing about 75% of solids and including pectin, sugar and acid; the batch containing a weight of pectin one and one-half or more times that which would normally set the solids present in a jelly of 65% solids content; the batch also containing sufficient acid to impart a tart taste thereto; and sodium citrate in an amount sufficient to permit the batch to set sufficiently slowly to permit handling and pouring in commercial operation and form a tart, firm, smooth-textured gel.

16. A pectin jelly batch for confectioners' products containing about 75% of solids and including pectin, sugar and acid; the batch containing a weight of pectin one and one-half or more times that which would normally set the solids present in a jelly of 65% solids content; the batch also containing sufficient acid to impart a tart taste thereto; and sodium acetate in said batch in an amount sufficient to permit the batch to set sufficiently slowly to permit handling and pouring in commercial operation and form a tart, firm, smooth-textured gel.

17. A pectin jelly batch suitable for confectioners' products, said jelly batch being high in pectin content and acid constituents and including a soluble salt of a strong base and a weak acid and sugar or its equivalent, said batch being characterized by the presence of a sufficient amount of said salt whereby the batch will set sufficiently slowly to permit handling and pouring in commercial operation and form a tart, firm, smooth-textured gel containing about 75% of solids.

18. A pectin jelly batch containing about 75% of solids, comprising: sufficient acid to impart a tart taste thereto, pectin in an amount equivalent to one and one-half or more times the weight of pectin which would normally set the solids present in a jelly of 65% solids content, sugar, or its equivalent, and a sufficient amount of a salt of a strong base and a weak acid to permit said batch to set slowly to a firm, smooth-textured, tart gel.

19. A pectin jelly batch containing about 75% of solids, comprising: sufficient acid to impart a tart taste thereto, pectin in an amount equivalent to one and one-half or more times the weight of pectin which would normally set the solids present in a jelly of 65% solids content, sugar or its equivalent, and a sufficient amount of sodium acetate to permit said batch to set slowly to a firm, smooth-textured, tart gel.

20. A pectin jelly batch containing about 75% of solids, comprising: sufficient acid to impart a tart taste thereto, pectin in an amount equivalent to one and one-half or more times the weight of pectin which would normally set the solids present in a jelly of 65% solids content, sugar or its equivalent, and a sufficient amount of sodium citrate to permit said batch to set slowly to a firm, smooth-textured, tart gel.

21. A confection comprising a pectin gel which contains about 75% of soluble solids, one and one-half or more times the weight of pectin which would normally set the solids present in a jelly of 65% solids content, a sufficient amount of acid to impart a tart taste, and containing from about 0.28% to 0.46% sodium acetate or its equivalent, said confection being characterized by being tart to the taste, firm, and smooth in texture.

22. A pectin preparation suitable for use in confectioners' jelly batches containing about 75% of solids and high in acid constituents, comprising: dry pectin, sodium acetate in the proportion of about 15 to 25 parts of crystalline sodium acetate to 100 parts of 100 grade pectin or its equivalent, and from about 5% to 50% of lactose by weight of the pectin.

23. A pectin preparation suitable for use in confectioners' jelly batches containing about 75% of solids and high in acid constituents, comprising: dry pectin, a salt of a strong base and a weak acid in the proportion of about 15 to 25 parts of such salt to 100 parts of 100 grade pectin or its equivalent, and from about 5% to 50% of lactose by weight of the pectin.

24. In a method of making confections, the steps of dissolving in an aqueous medium the equivalent of 100 parts of 100 grade pectin, a sufficient amount of a salt of a strong base and a weak acid to permit said confection to set slowly to a firm, smooth textured, tart gel, and not more than about 4000 parts of sugar or its equivalent and sufficient acid to impart a tart taste to the batch, cooking the batch to a concentration of approximately 75% solids, and dipping confectionery materials in such cooked batch to form a tart jelly-like coating thereon.

25. A pectin preparation suitable for use in confectioners' jelly batches containing about 75% of solids high in acid constituents, comprising: dry pectin, from about 5% to 50% of lactose by weight of the pectin, and a sufficient amount of a soluble salt of a strong base and a weak acid to permit such a batch made with said preparation to set slowly to a firm, smooth textured, tart gel.

DONALD R. THOMPSON.
GLENN H. JOSEPH.